US010491833B2

(12) United States Patent
Miyamoto (10) Patent No.: US 10,491,833 B2
(45) Date of Patent: Nov. 26, 2019

(54) INFORMATION PROCESSING APPARATUS, INFORMATION PROCESSING METHOD, AND NON-TRANSITORY COMPUTER-READABLE RECORDING MEDIUM

(71) Applicant: CASIO COMPUTER CO., LTD., Shibuya-ku, Tokyo (JP)

(72) Inventor: Naotomo Miyamoto, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 5 days.

(21) Appl. No.: 15/889,934

(22) Filed: Feb. 6, 2018

(65) Prior Publication Data

US 2018/0288302 A1    Oct. 4, 2018

(30) Foreign Application Priority Data

Mar. 28, 2017    (JP) .................. 2017-062543

(51) Int. Cl.
*H04N 5/225*    (2006.01)
*H04N 5/235*    (2006.01)

(52) U.S. Cl.
CPC ......... *H04N 5/2353* (2013.01); *H04N 5/2351* (2013.01)

(58) Field of Classification Search
CPC .................................................. H04B 10/116
See application file for complete search history.

(56) References Cited

U.S. PATENT DOCUMENTS

| 10,193,627 B1* | 1/2019 | Herman ............... H04B 10/116 |
| 2010/0034540 A1* | 2/2010 | Togashi ............... H04B 10/116 398/118 |
| 2013/0330088 A1* | 12/2013 | Oshima ............... H04B 10/11 398/130 |
| 2014/0186026 A1* | 7/2014 | Oshima ............... H04B 10/116 398/25 |

(Continued)

FOREIGN PATENT DOCUMENTS

| JP | 2007019935 A | 1/2007 |
| JP | 2010147527 A | 7/2010 |
| JP | 2014135577 A | 7/2014 |

*Primary Examiner* — Twyler L Haskins
*Assistant Examiner* — Dwight Alex C Tejano
(74) *Attorney, Agent, or Firm* — Holtz, Holtz & Volek PC (57) ABSTRACT

A position coordinates setter sets position coordinates being coordinates of an image region of an LED in an image. An image region determiner determines whether or not an image region having a predetermined luminance value is present at the position coordinates. If an image region having the predetermined luminance value is not present at the position coordinates, the image region determiner determines whether or not the image region at the position coordinates is overexposed or underexposed, and the exposure controller continues setting, if the image region is overexposed, the exposure time shorter by one degree at a time until the luminance value of the image region at the position coordinates becomes the predetermined luminance value, and continues setting, if the image region is underexposed, the exposure time longer by one degree at a time until the luminance value of the image region at the position coordinates becomes the predetermined luminance value.

11 Claims, 5 Drawing Sheets

(56) References Cited

U.S. PATENT DOCUMENTS

2014/0314420 A1* 10/2014 De Bruijn .......... H05B 37/0272
                                                    398/127
2016/0191159 A1*  6/2016 Aoyama .............. H04N 21/436
                                                    398/172
2017/0219684 A1*  8/2017 Jovicic ................ H04W 64/006

* cited by examiner

| IMAGING WITH EXPOSURE TIME a | IMAGING WITH EXPOSURE TIME b | IMAGING WITH EXPOSURE TIME c | IMAGING WITH EXPOSURE TIME a | IMAGING WITH EXPOSURE TIME b | IMAGING WITH EXPOSURE TIME c | ... |

INFORMATION PROCESSING APPARATUS, INFORMATION PROCESSING METHOD, AND NON-TRANSITORY COMPUTER-READABLE RECORDING MEDIUM

CROSS-REFERENCE TO RELATED APPLICATION

This application claims the benefit of Japanese Patent Application No. 2017-062543, filed on Mar. 28, 2017, the entire disclosure of which is incorporated by reference herein.

FIELD

The present disclosure relates to an information processing apparatus, an information processing method, and a non-transitory computer-readable recording medium.

BACKGROUND

In the prior art, a technique, such as the one disclosed in Unexamined Japanese Patent Application Kokai publication No. 2010-147527, using a visible light communication technique in which a camera images a light source (information light source) such as a marker and the like being provided at places in a facility and transmitting information by means of visible light communication, and decodes the imaged image to information have been conceived.

SUMMARY

An information processing apparatus according to the present disclosure comprises an image inputter that inputs an image imaged with a predetermined exposure time and an exposure controller that controls to adjust an exposure time so that information can be acquired from an image region corresponding with an information light source that transmits information by a visible light communication in the image input to the image inputter.

Moreover, an information processing method according to the present disclosure includes an image input step that inputs an image imaged with a predetermined exposure time and an exposure control step that controls to adjust an exposure time so that information can be acquired from an image region corresponding with an information light source that transmits information by a visible light communication in the image input to the image step.

Moreover, a non-transitory computer-readable recording medium according to the present disclosure stores a program for causing a computer to function as an image inputter that inputs an image imaged with a predetermined exposure time and an exposure controller that controls to adjust an exposure time so that information can be acquired from an image region corresponding with an information light source that transmits information by a visible light communication in the image input to the image inputter.

BRIEF DESCRIPTION OF THE DRAWINGS

A more complete understanding of this application can be obtained when the following detailed description is considered in conjunction with the following drawings, in which.

DETAILED DESCRIPTION

Hereinafter, an information processing device according to an embodiment of the present disclosure will be described with reference to the drawings.

Figure 1:
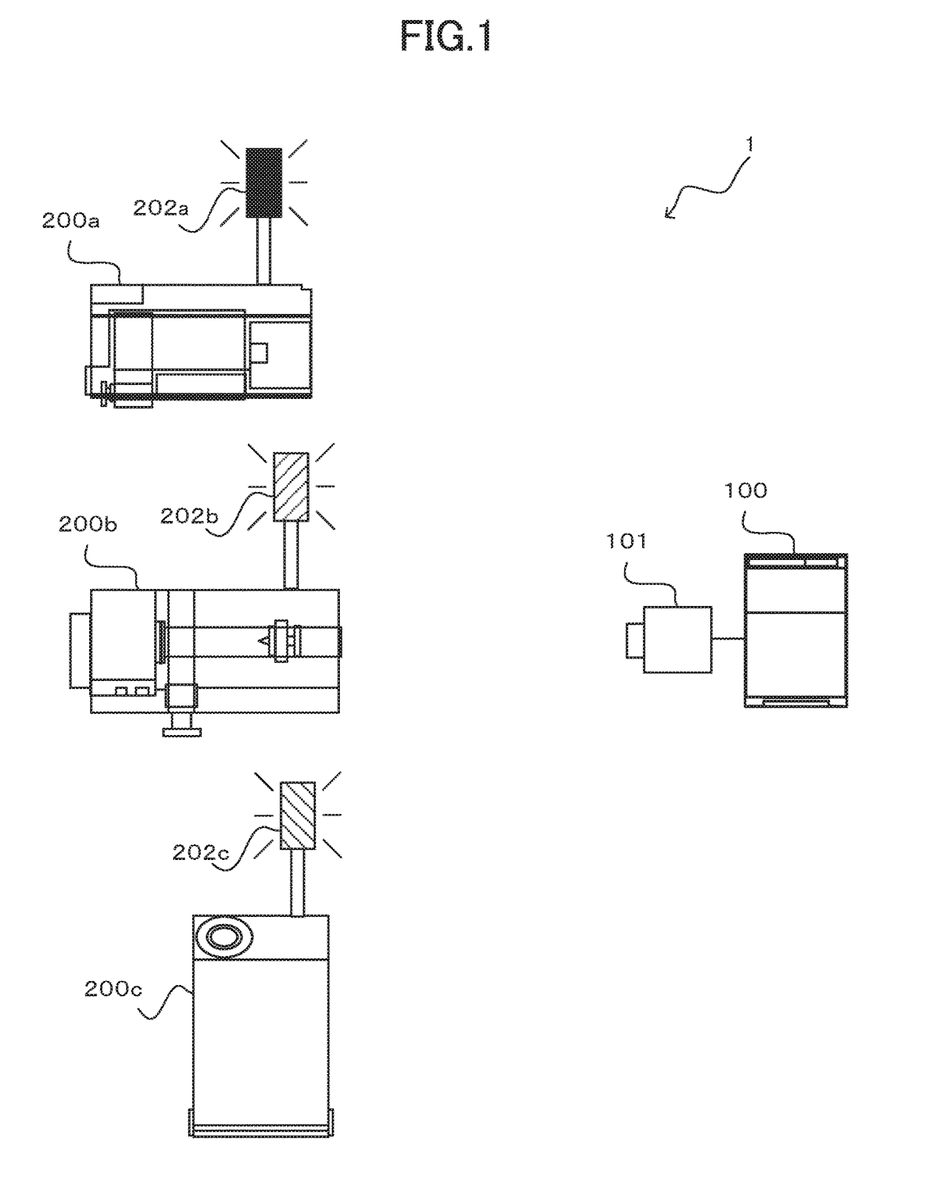
FIG. 1 is a diagram that shows an example of a configuration of the visible light communication system according to an embodiment of the present disclosure.

FIG. 1 is a diagram that shows a configuration of a visible light communication system that includes an information processing system. As shown in FIG. 1, the visible light communication system 1 includes an information processing apparatus 100 and monitoring target apparatuses 200a, 200b, and 200c (hereafter termed "the monitoring target apparatus 200" as appropriate when the monitoring target apparatuses 200a, 200b, and 200c are not specified). The information processing apparatus 100 includes an imager 101. The monitoring target apparatus 200a includes a light emitting diode (LED) 202a, the monitoring target apparatus 200b includes a LED 202b, and the monitoring target apparatus 200c includes a LED 202c (hereafter termed "the LED 202" as appropriate when the LEDs 202a, 202b, and 202c are not specified).

In this embodiment, the LEDs 202 included in the monitoring target apparatuses 200 transmits information by emitting light corresponding to the transmit-target information. On the other hand, in the information processing apparatus 100, the imager 101 performs imaging, and the transmit-target information is acquired from an image of light included in the imaged image.

Figure 2:
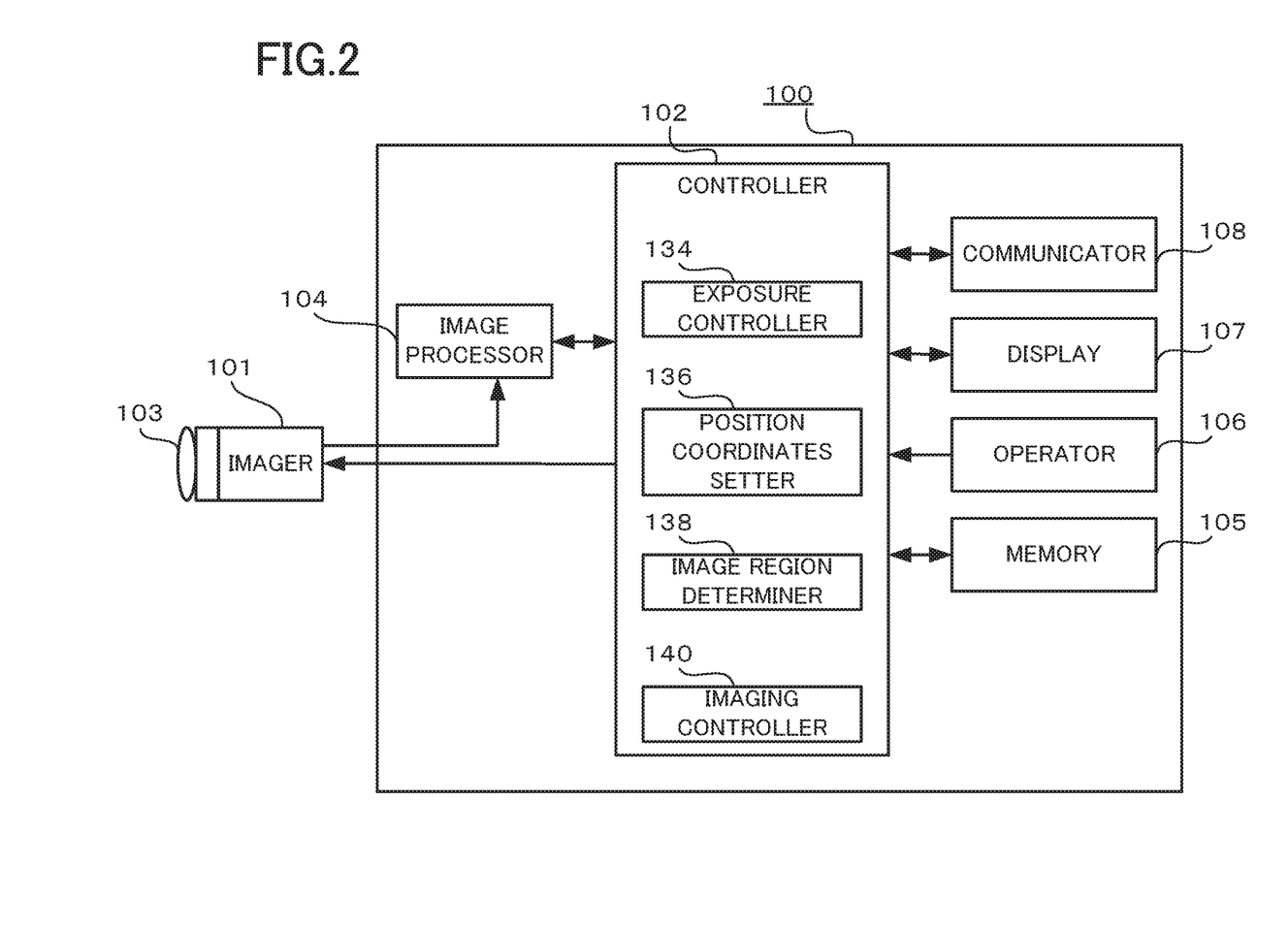
FIG. 2 is a diagram that shows an example of a configuration of the information processing apparatus according to the embodiment.

FIG. 2 is a diagram that shows an example of a configuration of the information processing apparatus 100. As shown in FIG. 2, the information processing apparatus 100 includes an imager 101, a controller 102, an image processor 104, a memory 105, an operator 106, a display 107, and a communicator 108.

The imager 101 includes a lens 103. The lens 103 comprises a zoom lens and the like. The lens 103 moves according to zoom control operation from the operator 106 and focusing control by the controller 102. The imaging field angle and the optical image in imaging by the imager 101 are controlled by the movement of the lens 103.

The imager 101 comprises multiple light receiving elements that are regularly arranged in a two-dimensional array on a light receiving plane. The light receiving element is, for example, an imaging device such as a charge coupled device (CCD), a complementary metal oxide semiconductor (CMOS) and the like. The imager 101 images (receives light), at a predetermined imaging cycle (for example, an imaging cycle that is double the light emission cycle of the LEDs 202), an optical image that is entered via the lens 103 with a imaging field angle within a predetermined range and a predetermined exposure time according to a control signal from the controller 102, and converts an image signal within the imaging field angle to digital data to generate a frame of image. Moreover, the imager 101 performs imaging and generating of a frame successively in terms of time and outputs successive frames to the image processor 104.

The image processor 104 outputs, according to a control signal from the controller 102, the frames (digital data) that are output by the imager 101 to the controller 102. Moreover, the image processor 104 has the function of encoding and filing, when a control signal based on a storing instruction operation from the operator 106 is input, the optical image within the imaging field angle of the imager 101 at the time of input of the storing instruction or, alternatively, the optical image within a display range that is displayed on the display 107, according to a compression encoding format such as, for example, the joint photographic experts group (JPEG) and the like.

The controller 102 comprises, for example, a central processing unit (CPU). The controller 102 controls various functions with which the information processing apparatus 100 is provided with, by performing software processes according to programs that are stored in the memory 105 (for example, a program for realizing the operation of the information processing apparatus 100 that is shown in FIGS. 5 and 6 described later).

The memory 105 is, for example, a random access memory (RAM) and a read only memory (ROM). The memory 105 stores various kinds of information (programs and the like) that are used for control in the information processing apparatus 100 and the like.

The operator 106 is, for example, a touch panel that is formed on the upper surface of the display 107, and an interface that is used for inputting a content of operation by a user. The display 107 comprises, for example, a liquid crystal display (LCD), a plasma display panel (PDP), an electroluminescence (EL) display, or the like. The display 107 displays an image according to an image signal that is output by the controller 102. In this process, the controller 102 outputs an image signal corresponding to the frames that are output by the imager 101 to the display 107. The communicator 108 is, for example, a LAN card. The communicator 108 performs communication with an external communication apparatus.

The controller 102 comprises an exposure controller 134, a position coordinates setter 136, an image region determiner 138, and an imaging controller 140.

When an image is displayed on the display 107 and the user operates the operator 106 to select coordinates on a coordinate plane being a frame corresponding to the image, the position coordinates setter 136 sets these coordinates as coordinates (position coordinates) of an image region of the LED 202 that is a light source that transmits information by means of visible light communication. In this embodiment, when multiple sets of coordinates are selected, the position coordinates setter 136 sets each set of coordinates as the position coordinates.

The image region determiner 138 determines whether or not an image region having a predetermined luminance value is present at the position coordinates in a frame of image input from the image processor 104. The image region having the predetermined luminance value is an image region of the LED 202. In this embodiment, the image region determiner 138 recognizes a luminance value (a lightness value) out of values of the pixel corresponding to the position coordinates, and determines whether or not the luminance value is the predetermined luminance value. In this embodiment, the predetermined luminance value that is used for the determination is a predetermined range (a proper luminance range) between predetermined upper limit and lower limit. If the luminance value is the predetermined luminance value, the image region determiner 138 determines that an image region having the predetermined luminance value is present at the position coordinates.

If an image region having the predetermined luminance value is present at the position coordinates, the exposure controller 134 stores information of the currently set exposure time in the memory 105. Thereafter, the exposure time that is stored in the memory 105 is set in imaging by the imager 101.

Moreover, the exposure controller 134 determines that the image region at the position coordinates is overexposed when the luminance value of the image region at the position coordinates is above the proper luminance range, and determines that the image region at the position coordinates is underexposed when the luminance value of the image region at the position coordinates is below the proper luminance range. When the luminance value is above the proper luminance range, the exposure controller 134 sets the exposure time shorter by one degree compared to the currently set exposure time. On the other hand, when the luminance value is below the proper luminance range, the exposure controller 134 sets the exposure time longer by one degree compared to the currently set exposure time.

After a new exposure time is set, imaging by the imager 101 and image input continue. Then, again, the exposure controller 134 determines that the image region at the position coordinates is overexposed when the luminance value of the image region at the position coordinates is above the proper luminance range, and determines that the image region at the position coordinates is underexposed when the luminance value of the image region at the position coordinates is below the proper luminance range. When the luminance value is above the proper luminance range, the exposure controller 134 sets the exposure time shorter by one degree compared to the currently set exposure time. On the other hand, when the luminance value is below the proper luminance range, the exposure controller 134 sets the exposure time longer by one degree compared to the currently set exposure time. Above-described process is repeated until the luminance value of the image region at the position coordinates falls within the proper luminance range. Then, when the luminance value of the image region at the position coordinates falls within the proper luminance range, the exposure controller 134 stores information of the currently set exposure time in the memory 105.

When there are multiple sets of position coordinates, the above-described processes by the image region determiner 138 and the exposure controller 134 is performed for each set of position coordinates. Then, information of one or multiple exposure times is stored. In this embodiment, when an exposure time is not set by the exposure controller 134, information of a reference exposure time is stored in the memory 105.

Figure 3:
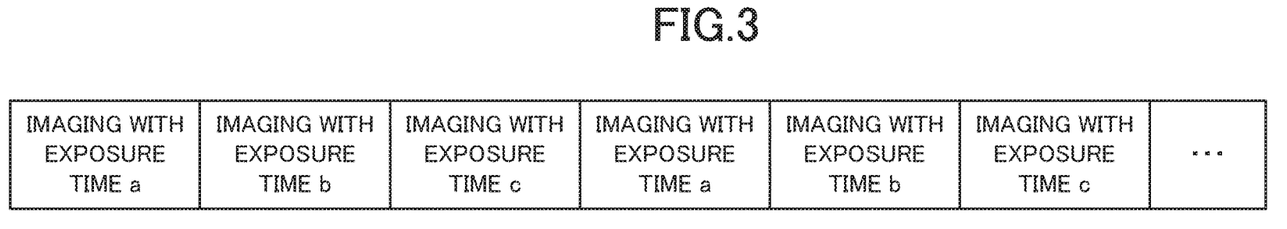
FIG. 3 is a diagram that shows outline of the change of the exposure time according to the embodiment.

After the exposure time is set, the imaging controller 140 controls the imager 101 to take perform imaging with the set exposure time. When multiple exposure times are set, the imaging controller 140 controls the exposure time of the imager 101 to be periodically switched between the multiple set exposure times. For example, as shown in FIG. 3, when three exposure times a, b, and c are set, the imaging controller 140 controls the exposure time of the imager 101 to be periodically switched to the exposure time a, the exposure time b, and the exposure time c in this order.

Moreover, the controller 102 controls decoding of a bit data string corresponding to the hue value or the luminance value at the position coordinates in multiple frames of image that are successively acquired in a time series manner to acquire transmit-target information.

Figure 4:
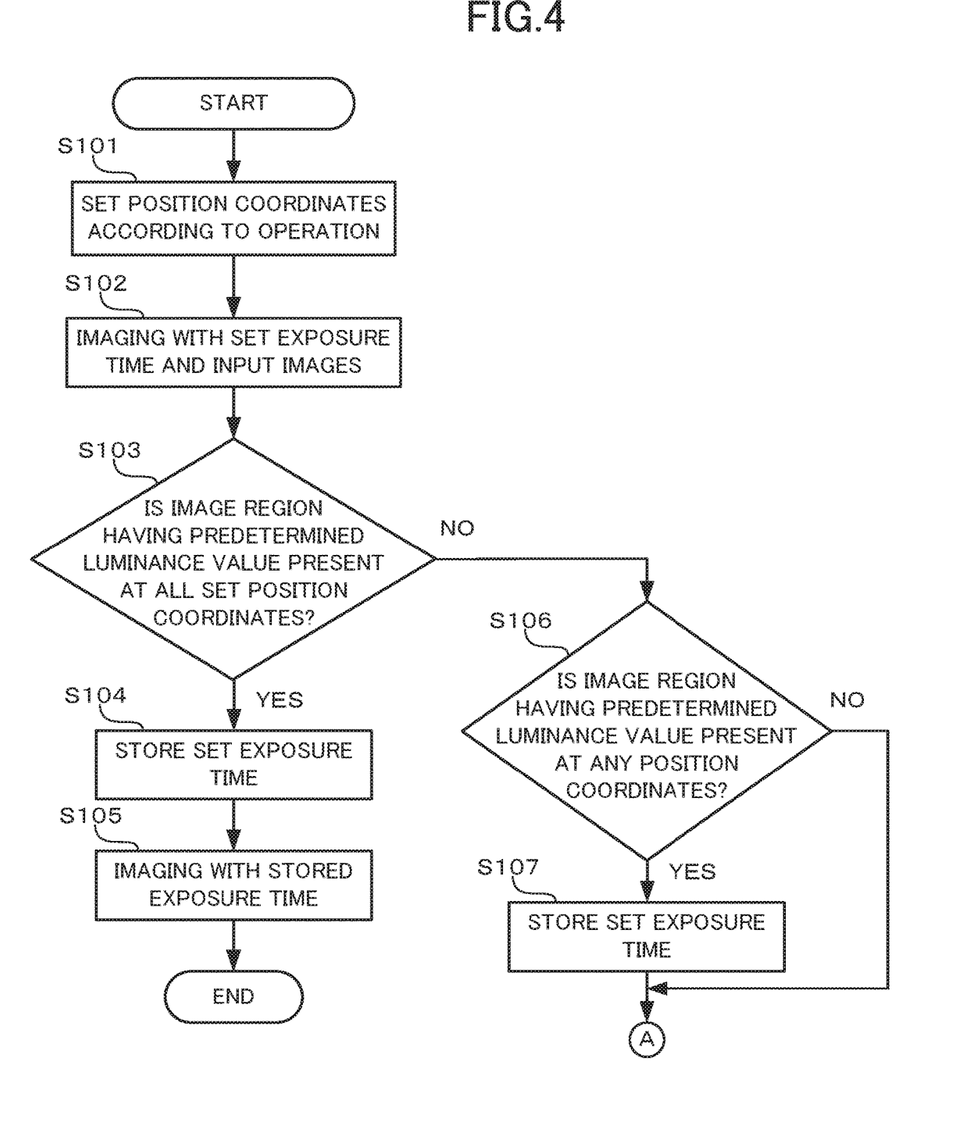
FIG. 4 is a flowchart that shows an example of the operation of the exposure time setting process performed by the information processing apparatus according to the embodiment.
Figure 5:
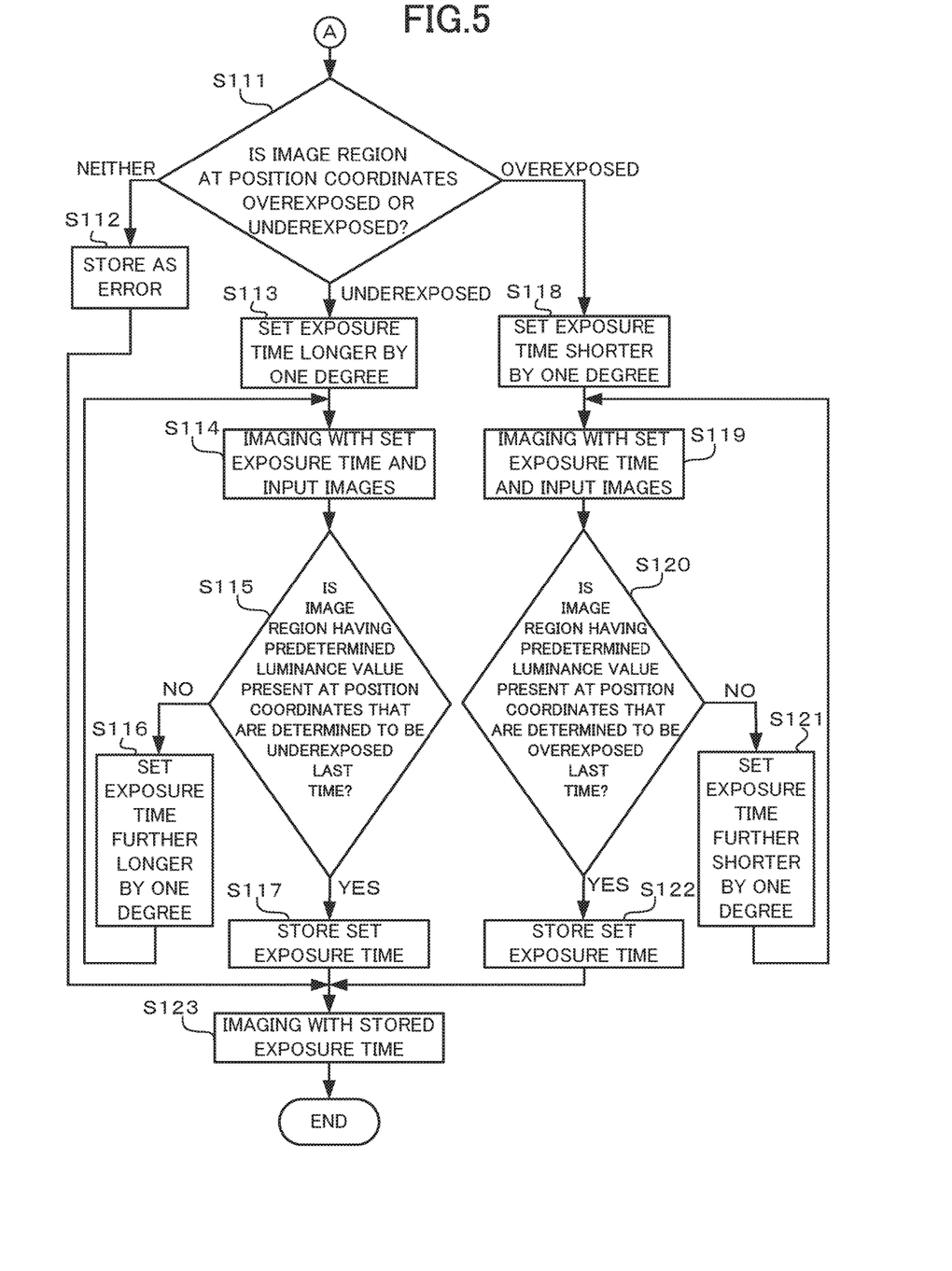
FIG. 5 is a flowchart that shows an example of the operation of the exposure time setting process performed by the information processing apparatus according to the embodiment.

Next, operations of the information processing apparatus 100 will be described. FIG. 4 and FIG. 5 are flowcharts that show an example of the operation of the exposure time setting process performed by the information processing apparatus 100.

When an image is displayed on the display 107 and the user operates the operator 106 to select coordinates on a coordinate plane being a frame that corresponds to the image, the position coordinates setter 136 within the controller 102 sets, in response to the operation, the coordinates as the position coordinates (Step S101). In this embodiment, multiple sets of position coordinates are set.

Next, when the user operates the operator 106 to set an exposure time, the imaging controller 140 controls the imager 101 to perform imaging with the set exposure time. The imager 101 performs imaging with the exposure time that is controlled by the imaging controller 140, generates frames of image, and outputs successive frames to the image processor 104. The image processor 104 outputs the frames of image to the controller 102, and the controller 102 inputs the frames of image (Step S102).

Next, the image region determiner 138 determines whether or not an image region having a predetermined luminance value (a luminance value within a proper luminance range) is present at all sets of position coordinates set in the Step S101 in the frames of image input from the image processor 104 (Step S103).

If an image region having the predetermined luminance value is present at all sets of position coordinates (Step S103; YES), the exposure controller 134 stores information of the exposure time that is set in the Step S102 in the memory 105 (Step S104). Thereafter, the imaging controller 140 controls the imager 101 to perform imaging with the exposure time that is stored in the memory 105 in the Step S104. The imager 101 performs imaging with the exposure time that is controlled by the imaging controller 140 (Step S105).

On the other hand, if an image region having a luminance value other than the predetermined luminance value is present at any of the position coordinates (Step S103; NO), next, the image region determiner 138 determines whether or not an image region having the predetermined luminance value is present at any of the position coordinates (Step S106). If an image region having the predetermined luminance value is present at any of the position coordinates (Step S106; YES), the exposure controller 134 stores in the memory 105 information of the exposure time that is set in the Step S101 (Step S107). Thereafter, the process proceeds to the operation that is shown in FIG. 5. Moreover, if an image region having the predetermined luminance value is not present at any of the position coordinates (Step S106; NO), the process proceeds to the operation that is shown in FIG. 5 as well.

The processes of Steps S111 to S122 shown in FIG. 5 are performed for each image region that does not have the predetermined luminance value. Firstly, the image region determiner 138 determines whether the image region at the position coordinates is overexposed or underexposed (Step S111). In this embodiment, the image region determiner 138 determines that the image region at the position coordinates is overexposed when the luminance value of the image region at the position coordinates is above the proper luminance range, and determines that the image region at the position coordinates is underexposed when the luminance value of the image region at the position coordinates is below the proper luminance range.

If the image region at the position coordinates is neither overexposed nor underexposed (Step S111; NEITHER), the exposure controller 134 stores in the memory 105 error information that indicates the position coordinates being an error (Step S112).

Moreover, if the image region at the position coordinates is underexposed (Step S111; UNDEREXPOSED), the exposure controller 134 sets the exposure time longer by one degree than the currently set exposure time (Step S113).

Next, the imaging controller 140 controls the imager 101 to perform imaging with the exposure time that is set in the Step S113. The imager 101 performs imaging with the exposure time that is controlled by the imaging controller 140, generates frames of image, and outputs successive frames to the image processor 104. The image processor 104 outputs the frames of image to the controller 102, and the controller 102 inputs the frames of image (Step S114).

Next, the image region determiner 138 determines whether an image region having the predetermined luminance value is present at the position coordinates that are determined to be underexposed in the step S111 out of the position coordinates in the frames of image input from the image processor 104 (Step S115). If no image region having the predetermined luminance value is present at the position coordinates that are determined to be underexposed in the step S111 (Step S115; NO), the exposure controller 134 sets the exposure time further longer by one degree than the currently set exposure time (Step S116). Thereafter, the processes of the Step S114 and subsequent steps are repeated.

On the other hand, if an image region having the predetermined luminance value is present at the position coordinates that are determined to be underexposed in the step S111 (Step S115; YES), the exposure controller 134 stores information of the currently set exposure time (the exposure time that is set in the Step S113 or in the Step S116) in the memory 105 (Step S117).

Moreover, if the image region at the position coordinates is overexposed (Step S111; OVEREXPOSED), the exposure controller 134 sets the exposure time shorter by one degree than the currently set exposure time (Step S118).

Next, the imaging controller 140 controls the imager 101 to perform imaging with the exposure time that is set in the Step S118. The imager 101 performs imaging with the exposure time that is controlled by the imaging controller 140, generates frames of image, and outputs successive frames to the image processor 104. The image processor 104 outputs the frames of image to the controller 102, and the controller 102 inputs the frames of image (Step S119).

Next, the image region determiner 138 determines whether or not an image region having the predetermined luminance value is present at the position coordinates that are determined to be overexposed in the step S111 out of the position coordinates in the frames of image input from the image processor 104 (Step S120). If no image region having the predetermined luminance value is present at the position coordinates that are determined to be overexposed in the step S111 (Step S120; NO), the exposure controller 134 sets the exposure time further shorter by one degree than the currently set exposure time (Step S121). Thereafter, the processes of the Step S119 and subsequent steps are repeated.

On the other hand, if an image region having the predetermined luminance value is present at the position coordinates that are determined to be overexposed in the step S111

(Step S120; YES), the exposure controller 134 stores information of the currently set exposure time (the exposure time that is set in the Step S118 or in the Step S121) in the memory 105 (Step S122).

After performing the processes of Step S112, the Step S117, or the Step S122, the imaging controller 140 controls the imager 101 to perform imaging with the exposure time that is stored in the memory 105. The imager 101 performs imaging with the exposure time that is controlled by the imaging controller 140, generates frames of image, and outputs successive frames to the image processor 104. The image processor 104 outputs the frames of image to the controller 102, and the controller 102 inputs the frames of image (Step S123). In this embodiment, when information of multiple exposure times is stored in the memory 105, the imaging controller 140 controls the exposure time of the imager 101 to be periodically switched between the multiple stored exposure times. Moreover, when no exposure time is stored in the Step S104, the Step S107, the Step S117, or the Step S122, the imaging controller 140 controls the exposure time of the imager 101 to be a reference exposure time that is stored in the memory 105 in advance.

As described above, in the information processing apparatus 100 according to the present embodiment, the position coordinates setter 136 within the controller 102 sets position coordinates being the coordinates of an image region of the LED 202 in an image. The image region determiner 138 determines whether or not an image region having the predetermined luminance value (a luminance value within the proper luminance range) is present at the position coordinates. If an image region having the predetermined luminance value is present at the position coordinates, the exposure controller 134 stores the current exposure time in the memory 105. On the other hand, if no image region having the predetermined luminance value is present at the position coordinates, the image region determiner 138 determines whether the image region at the position coordinates is overexposed or underexposed. Furthermore, the exposure controller 134 continues, when the image region is overexposed, setting the exposure time shorter by one degree at a time until the luminance value of the image region at the position coordinates becomes the predetermined luminance value, while continues, when the image region is underexposed, setting the exposure time longer by one step at a time until the luminance value of the image region at the position coordinates becomes the predetermined luminance value. Then, when the luminance value of the image region at the position coordinates becomes the predetermined luminance value, the exposure controller 134 stores the current exposure time in the memory 105. Thereafter, the imaging controller 140 controls the exposure time of the imager 101 to be the exposure time that is stored in the memory 105, and the imager 101 performs imaging. As a result, the image region of the LED 202 being a light source that transmits information by means of visible light communication can be properly recognized.

Moreover, when the position coordinates setter 136 sets multiple sets of position coordinates, the image region determiner 138 determines whether or not an image region having the predetermined luminance value is present at each set of position coordinates, and the exposure controller 134 sets an exposure time for each set of position coordinates. Then, the imaging controller 140 controls the exposure time of the imager 101 to be periodically switched between multiple exposure times. As a result, even under an environment in which a difference in brightness between places at which each of the LEDs 202 are provided are significant, the exposure time is periodically switched to an exposure time suitable for each environment, whereby it is possible to properly recognize the image regions of each of the LEDs 202.

Note that, the present disclosure is not limited by the description of the above-described embodiment and the drawings, and the above-described embodiment and the drawings can be modified as appropriate.

For example, in the above-described embodiment, the position coordinates setter 136 sets the position coordinates being the coordinates of an image region of the LED 202 in an image according to an operation of the operator 106 by the user. However, the present disclosure is not limited to this embodiment, and the position coordinates setter 136 may automatically set the position coordinates. For example, the position coordinates setter 136 may assume the coordinates of a pixel having a luminance value that is equal to or greater than a predetermined value out of each pixels in an image, the coordinates of a pixel having a predetermined hue value out of each pixels in an image, or the coordinates of a pixel whose hue value changes with a predetermined period out of each pixels in an image, and the like to be the position coordinates.

Moreover, while the image region determiner 138 determines, in the above-described embodiment, whether or not an image region having the predetermined luminance value is present at the position coordinates, the image region determiner 138 may determine whether or not an image region having a predetermined hue value is present at the position coordinates, or determine, alternatively, whether or not an image region whose hue value periodically changes is present at the position coordinates.

Moreover, the information processing apparatus 100 may be any apparatus as long as the apparatus is provided with the imager 101 and capable of imaging. Note that, the imager 101 may be provided at the outside of the information processing apparatus 100.

Moreover, in the above-described embodiment, the program to be executed may be stored on a non-transitory computer-readable recording medium such as a flexible disc, a compact disc read-only memory (CD-ROM), a digital versatile disc (DVD), a magneto-optical disc (MO) and the like, be distributed, and be installed to configure a system that performs the above-described processes.

Moreover, the program may be stored in a disc apparatus or the like included in a predetermined information processing apparatus on a network such as the Internet and the like and be superimposed, for example, on carrier waves and be downloaded.

Note that, when the above-described functions are realized by an operating system (OS) in part, or when they are realized through cooperation of an OS and an application program, only non-OS part may be stored on a medium, and be distributed or be downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information processing apparatus, comprising:
a central processing unit which, under control of a stored program, executes functions comprising:
setting position coordinates assumed to be an image region of an information light source transmitting information by visible light communication in an image to be imaged;
determining whether or not an image region of an information light source transmitting information by the visible light communication is present at the position coordinates set in the setting, when an input image imaged with a predetermined exposure time is input; and
adjusting an exposure time so that the information can be acquired, when it is determined in the determining that an image region of the information light source is not present at the position coordinates set in the setting.

2. The information processing apparatus according to claim 1, wherein the determining determines whether or not an image region of an information light source transmitting information by the visible light communication is present by determining whether or not a luminance of the information light source falls within a range set in advance.

3. The information processing apparatus according to claim 1, wherein the adjusting comprises adjusting to multiple exposure times.

4. The information processing apparatus according to claim 1, wherein when there are multiple image regions of the information light source in the input image, the adjusting adjusts the exposure time so that the information can be acquired with respect to each of the multiple image regions of the information light source.

5. The information processing apparatus according to claim 4, wherein the central processing unit, under control of the stored program, further executes a function of acquiring the information with respect to each of the multiple image regions of the information light source using the exposure time adjusted in the adjusting.

6. An information processing method, including:
setting position coordinates assumed to be an image region of an information light source transmitting information by visible light communication in an image to be imaged;
determining whether or not an image region of an information light source transmitting information by the visible light communication is present at the position coordinates set in the setting, when an input image imaged with a predetermined exposure time is input; and
adjusting an exposure time so that the information can be acquired, when it is determined in the determining that an image region of the information light source is not present at the position coordinates set in the setting.

7. The information processing method according to claim 6, wherein the determining determines whether or not an image region of an information light source transmitting information by the visible light communication is present by determining whether or not a luminance of the information light source falls within a range set in advance.

8. The information processing method according to claim 6, wherein the adjusting comprises adjusting to multiple exposure times.

9. The information processing method according to claim 6, wherein when there are multiple image regions of the information light source in the input image the adjusting adjusts the exposure time so that the information can be acquired with respect to each of the multiple image regions of the information light source.

10. The information processing method according to claim 9, further including:
acquiring the information with respect to each of the multiple image regions of the information light source using the exposure time adjusted in the adjusting.

11. A non-transitory computer-readable recording medium storing a program for causing a computer to execute functions comprising:
setting position coordinates assumed to be an image region of an information light source transmitting information by visible light communication in an image to be imaged;
determining whether or not an image region of an information light source transmitting information by the visible light communication is present at the position coordinates set in the setting, when an input image imaged with a predetermined exposure time is input; and
adjusting an exposure time so that the information can be acquired, when it is determined in the determining that an image region of the information light source is not present at the position coordinates set in the setting.

* * * * *